United States Patent [19]
Wu et al.

[11] Patent Number: 5,986,749
[45] Date of Patent: Nov. 16, 1999

[54] FIBER OPTIC SENSING SYSTEM

[75] Inventors: Jian-Qun Wu, Houston, Tex.; Arthur D. Hay, Cheshire; Alan D. Kersey, South Glastonbury, both of Conn.

[73] Assignee: CiDRA Corporation, Wallingford, Conn.

[21] Appl. No.: 08/933,544

[22] Filed: Sep. 19, 1997

[51] Int. Cl.[6] .................................................. G01N 21/00
[52] U.S. Cl. ........................................ 356/73.1; 356/35.5
[58] Field of Search ........................... 356/32, 73.1, 360, 356/358, 35.5; 359/290; 324/690

[56] References Cited

U.S. PATENT DOCUMENTS

| | | | |
|---|---|---|---|
| 4,647,203 | 3/1987 | Jones et al. | 356/345 |
| 4,962,665 | 10/1990 | Savage et al. | 73/155 |
| 5,416,425 | 5/1995 | Mouaici | 324/690 |
| 5,453,693 | 9/1995 | Sinclair et al. | 324/324 |
| 5,497,321 | 3/1996 | Ramakrishnan et al. | 364/422 |
| 5,503,021 | 4/1996 | Lew | 73/661 |
| 5,597,042 | 1/1997 | Tubel et al. | 166/250.01 |
| 5,808,779 | 9/1998 | Weis | 359/290 |

*Primary Examiner*—Robert H. Kim
*Assistant Examiner*—Tu T. Nguyen

[57] ABSTRACT

A fiber optic sensor includes a sensor element responsive to a property or condition of a material, such a resistivity, capacitance, inductance, frequency, etc., for providing an output voltage signal that is dependent upon the property or condition of the material. The sensor further includes an optical-to-electrical conversion element, such as a photo detector or a solar cell, that converts an optical signal (photo detector driving optical signal) carried by an optical fiber into an electrical signal. The electrical signal is applied to the sensor element, and in response, the sensor element provides the output electrical signal. The output electrical signal is applied to a measurement device, such as a piezoelectric element, having at least one dimension that varies with changes in the output electrical signal. An optical strain sensor, such as a Bragg grating or Fabry Perot interferometer, is mounted to the measurement device such that changes in the dimension of the measurement device causes changes in the strain of the optical strain sensor. These changes in strain are detected and related to the property or condition of the material. The fiber optic sensor is particularly useful as a resistivity sensor for measuring the resistivity of a fluid. For example, the resistivity of a fluid mixture of oil and water can be measured for determining the relative water and oil content in the fluid mixture. In this configuration, the sensor element includes a pair of spaced apart conductive elements. The output electrical power from the photo detector is applied to the conductive elements and the fluid is passed between the conductive elements. The output voltage from the conductive elements varies in relation to the resistivity of the fluid sample between the conductive elements.

33 Claims, 7 Drawing Sheets

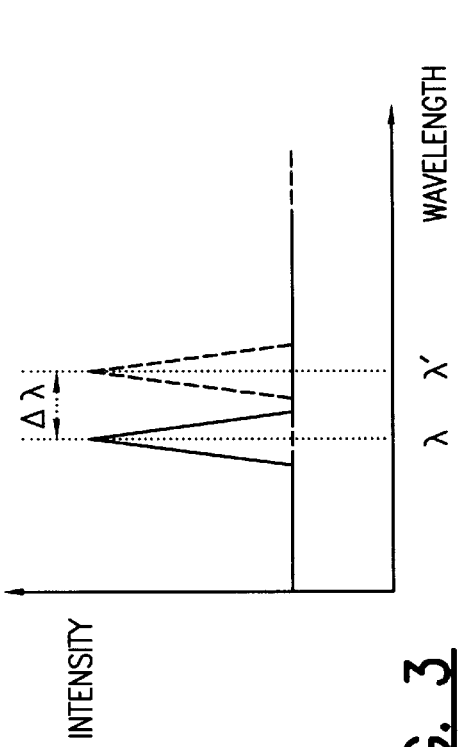
FIG. 3
FIG. 2
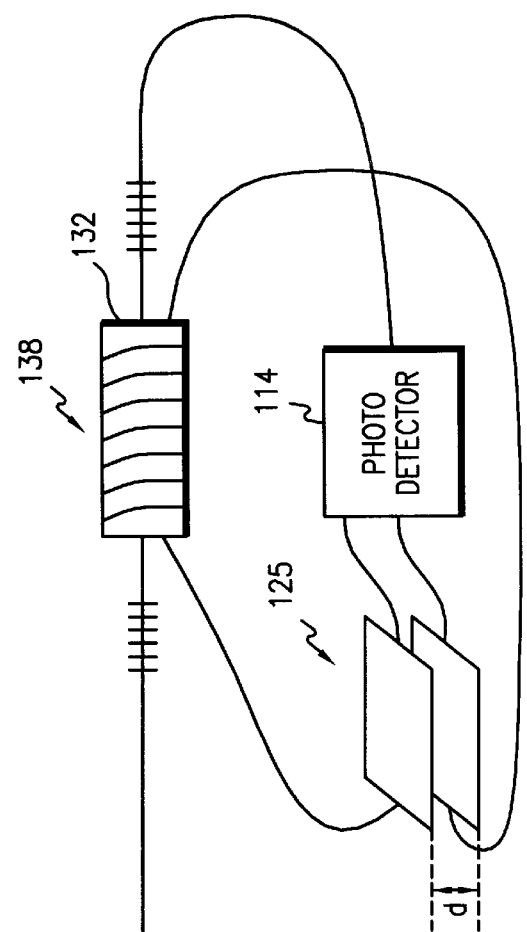
FIG. 4

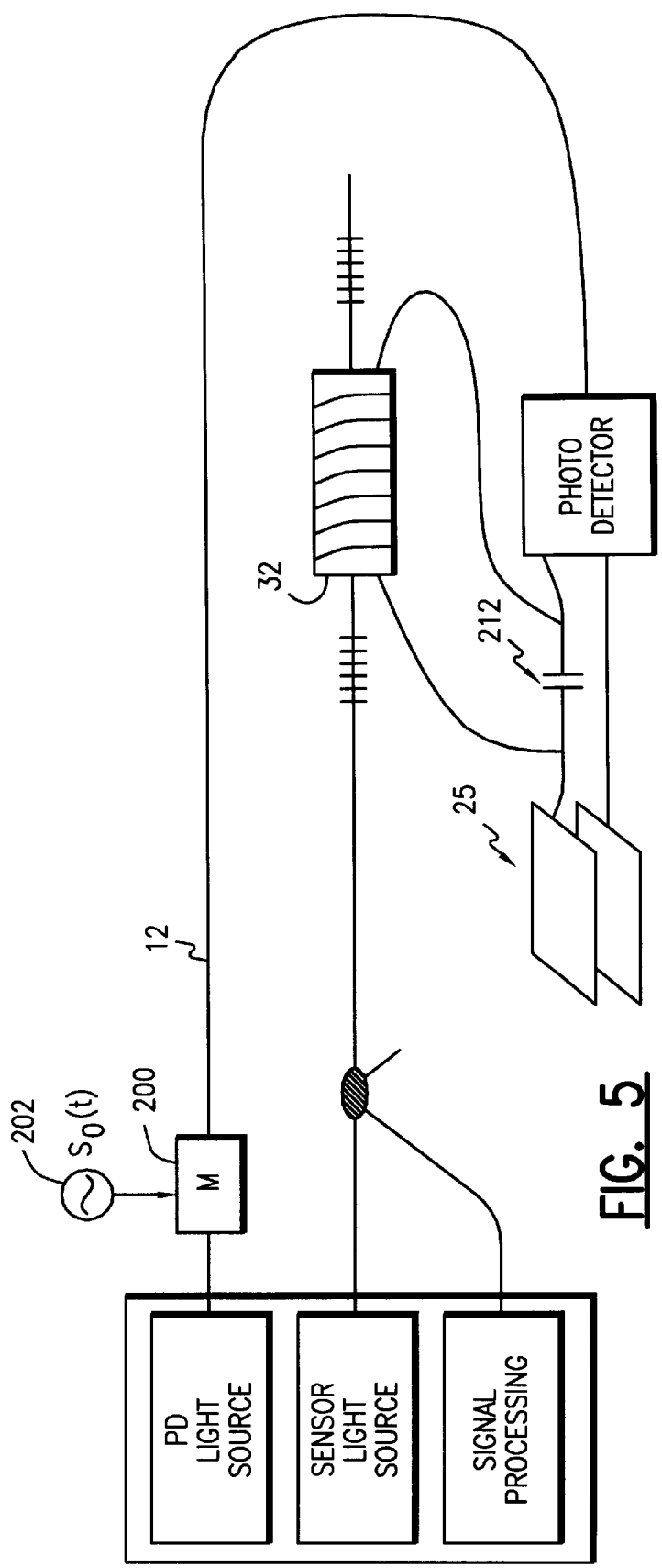

FIBER OPTIC SENSING SYSTEM

TECHNICAL FIELD

The present invention relates to a sensing system for measuring parameters such as resistivity, inductance, capacitance and frequency, and more particularly, to the use of intrinsic fiber optic elements in a fiber optic sensor system for measuring such parameters.

BACKGROUND OF INVENTION

Many techniques are presently known for maximizing the volume of oil produced by an oil well. One of these, for example, is called "production logging." Production logging generally refers to the process of lowering a "tool string" into a producing oil well that has been cased and perforated. The tool string may include a number of well known devices for performing various functions, such as perforating the well casing, sealing perforations in the well casing, pumping petroleum from the well, measuring characteristics of fluids in the well, and the like.

Petrophysicists are often interested in measuring characteristics of different fluids in the well, at different depths, to determine which depths of the well are producing oil, and the rate at which they are producing. Typically, perforations are made in the well casing at different depths to permit oil to flow into the wellbore from the surrounding strata. Although it is advantageous to create these perforations at depths corresponding to oil-bearing strata, these perforations are sometimes made at depths where a mixture of oil and water is located, or where water exists alone. In some cases, perforations are made at depths that initially produce a great deal of oil but eventually produce more and more water and less and less oil, due to depletion of the oil reserves at that depth. If it is determined that a certain depth of the well is non-producing, or is producing mostly saline water ("brine"), some remedial work is performed upon that depth of the well. For example, the perforations in the casing at that depth may be plugged to stop production. Then, other more productive depths of the well may continue producing. Moreover, new production may be initiated by perforating the casing at other, untapped depths of the well.

It is therefore an important function of production logging to measure the ratio of water to oil at different depths inside the well casing. Such a production log indicates whether the fluid flowing into the well at a particular location is oil or water. In most cases, the flow of water into the well does not add any value, but increases the cost of production. The indication of water to oil allows the well operator to take remedial action to plug the perforation in the well producing mostly water and otherwise control the well to maximize depletion of oil in the formation.

One known method of determining water and oil content in a fluid sample or fluid stream is to measure the resistivity of the fluid. Such a resistivity measurement is a measure of the resistance per unit length of a quantity of the fluid having a unit cross-section. The oil and underground water usually have very different resistivities. The underground salty water is more conductive than oil. By measuring the resistivity of the fluid, one can easily distinguish between oil and water. Indeed, resistivity measurement is one of the most important well logs (in most cases, the most important log) used by petrophysicists to evaluate the earth formation.

Known methods of measuring resistivity of fluid in a production well include various electronic probes and the like. Such instruments require the use of electronic equipment in the harsh environment of the well. A source of electrical power must be provided to such electronic equipment. It is also know to use sample chambers to help recognize the presence of water. With this arrangement, flowing fluids are directed into a partially enclosed volume within the logging tool where the fluids are coupled to measurement electrodes. Although this approach may be useful in some applications, it may be difficult to ensure that a representative sample will be obtained, due to the tendency of oil-water mixtures to separate in low-turbulence environments.

SUMMARY OF THE INVENTION

Objects of the present invention include the provision of reliable and accurate single or multi-point sensor for measuring parameters such as resistivity, inductance, capacitance and frequency.

A further object of the invention is to provide such sensors for use in the harsh environment of an oil well.

A still further object of the invention is to provide such sensors incorporating intrinsic fiber optic elements.

Another object of the invention is to provide such sensors that do not require a source of electrical power between the sensor location and the location of signal analysis equipment for operation.

According to the present invention, a sensor of the invention includes a sensor element responsive to a property or condition of a material (parameter), such as resistivity, capacitance, inductance, frequency, etc., for providing an output voltage signal that is dependent upon the property or condition of the material. The sensor further includes an optical-to-electrical conversion element, such as a photo detector or a solar cell, that converts an optical signal (photo detector driving optical signal) carried by an optical fiber into an electrical signal. The electrical signal is applied to the sensor element, and in response, the sensor element provides the output electrical signal. The output electrical signal is applied to a measurement device, such as a piezo-electric element, having at least one dimension that varies with changes in the output electrical signal. An optical strain sensor is mounted to the measurement device such that changes in the dimension of the measurement device causes changes in the strain of the optical strain sensor. These changes in strain are detected and related to the property or condition of the material.

In further accord with the present invention, the sensor may be used as a resistivity sensor for measuring the dielectric constant or resistivity of a material. The capacitance of the sensor element is constant, or a fixed capacitance is added, such that any variations in capacitance are negligible. Therefor any variations in the output electrical signal are directly related to resistivity.

According further to the invention, the sensor of the invention is particularly useful as a resistivity sensor for measuring the resistivity of a fluid. For example, the resistivity of a fluid mixture of oil and water can be measured for determining the relative water and oil content in the fluid mixture. In this embodiment of the invention, the sensor element includes a pair of spaced apart conductive elements. The output electrical power from the photo detector is applied to the conductive elements and the fluid is passed between the conductive elements. The output voltage from the conductive elements varies in relation to the resistivity of the fluid sample between the conductive elements.

According further to the present invention, the optical strain sensor may include a fiber Bragg grating formed in a length of optical fiber mounted to the measurement device.

The length of optical fiber is mounted such that the strain in the length of optical fiber varies with changes in the dimension of the measurement device. An input optical signal is injected into the optical fiber, and the Bragg grating reflects a portion of the input signal. The wavelength of the reflected signal (sensing signal) varies with changes in the strain of the Bragg grating. Alternatively, a Fabry-Perot type interferometer may be used wherein a length of optical fiber is situated between a pair of identical Bragg gratings. In this case, the length of optical fiber, which acts as a strain sensor, is mounted to the measurement device such that the strain in the length of optical fiber, and therefor the wavelength characteristics of the reflected (sensing) signal, varies with changes in the dimension of the measurement device.

In further accord with the present invention, the photo detector driving optical signal may be of a constant or fixed magnitude such that the electrical signal from the photo detector is a direct current (DC) signal. The measurement device (e.g., a piezoelectric element) is therefore driven by a DC output electrical signal from the sensing element. The wavelength characteristic of the reflected sensing optical signal change in response to the change in strain in the optical sensor caused by the change in the dimension of the measurement device caused by the DC output electrical signal.

In accordance with another embodiment of the invention, the photo detector driving optical signal is a time varying signal, such as a sinusoidal signal, having a predetermined frequency such that the electrical signal from the photo detector is an alternating current (AC) signal. In this case, the output electrical signal from the sensing device is essentially a scaled replica of the electrical signal from the photo detector, that is phase shifted by an amount related to the resistivity and capacitance of the sensing arrangement. The stress in the measurement device varies with the output electrical signal. Therefore, the sensing optical signal is also a time varying signal at the predetermined frequency and phase shifted by an amount related to the resistivity and capacitance. If either the resistivity or capacitance is known, the other variable may be determined by measuring the phase difference between the driving optical signal and the sensing optical signal.

In accordance with a still further embodiment of the invention, the sensing optical signal may be fed back to a modulator that is connected to modulate the driving optical signal. Once the sensor is activated, the sensing optical signal will resonate at a frequency related to the resistivity and capacitance of the sensing arrangement. Again, if either the resistivity or capacitance is known, the other variable may be determined by measuring the frequency of the sensing optical signal.

According further to the present invention, the sensing element may be a pressure sensitive resonance device that resonates at a frequency determined by the pressure the resonance device is exposed. In this case, a modulated optical signal is used to drive the photo detector such that AC power is provided to the resonance device.

According still further to the present invention, a pair of optical fibers may be used, one to drive the photo detector and the other to operate the optical sensor. Alternatively, a common fiber may be used to provide the driving optical signal to the photo detector and to carry the optical sensor.

The development of intrinsic fiber optic sensors which utilize strain-sensitive intracore Bragg gratings offers the possibility of constructing very small, rugged, and reliable sensors. Such sensors can be made very small in size, which allows several to fit within a confined space. Their intrinsic sensing capability, which requires no failure-prone electronics, also provides an extremely high level of reliability that surpasses conventional electrical sensors. In order to implement the sensor of the invention, a supply of electrical power to the sensor element is not required. Instead, the required electrical power is delivered to the sensor element by the photo detector that converts an optical signal into electrical energy.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 2 is a schematic block diagram of an alternative implementation of the intrinsic optical sensor used in the fiber optic resistivity sensor of FIG. 1;

FIG. 3 is a graph showing the wavelength shift is the reflected signal from an intrinsic optical sensor contained in the sensor of FIG. 2 in response to a measurement of resistivity;

FIG. 4 is a schematic block diagram of a second embodiment of the fiber optic resistivity sensor of FIG. 1;

FIG. 5 is a schematic block diagram of a third embodiment of the fiber optic resistivity sensor of FIG. 1;

FIG. 6 is a graph illustrating the phase shift in a sensing optical signal with respect to a driving optical signal, the magnitude of the phase shift being related to a resistivity measurement;

DETAILED DESCRIPTION OF THE INVENTION

Figure 1:
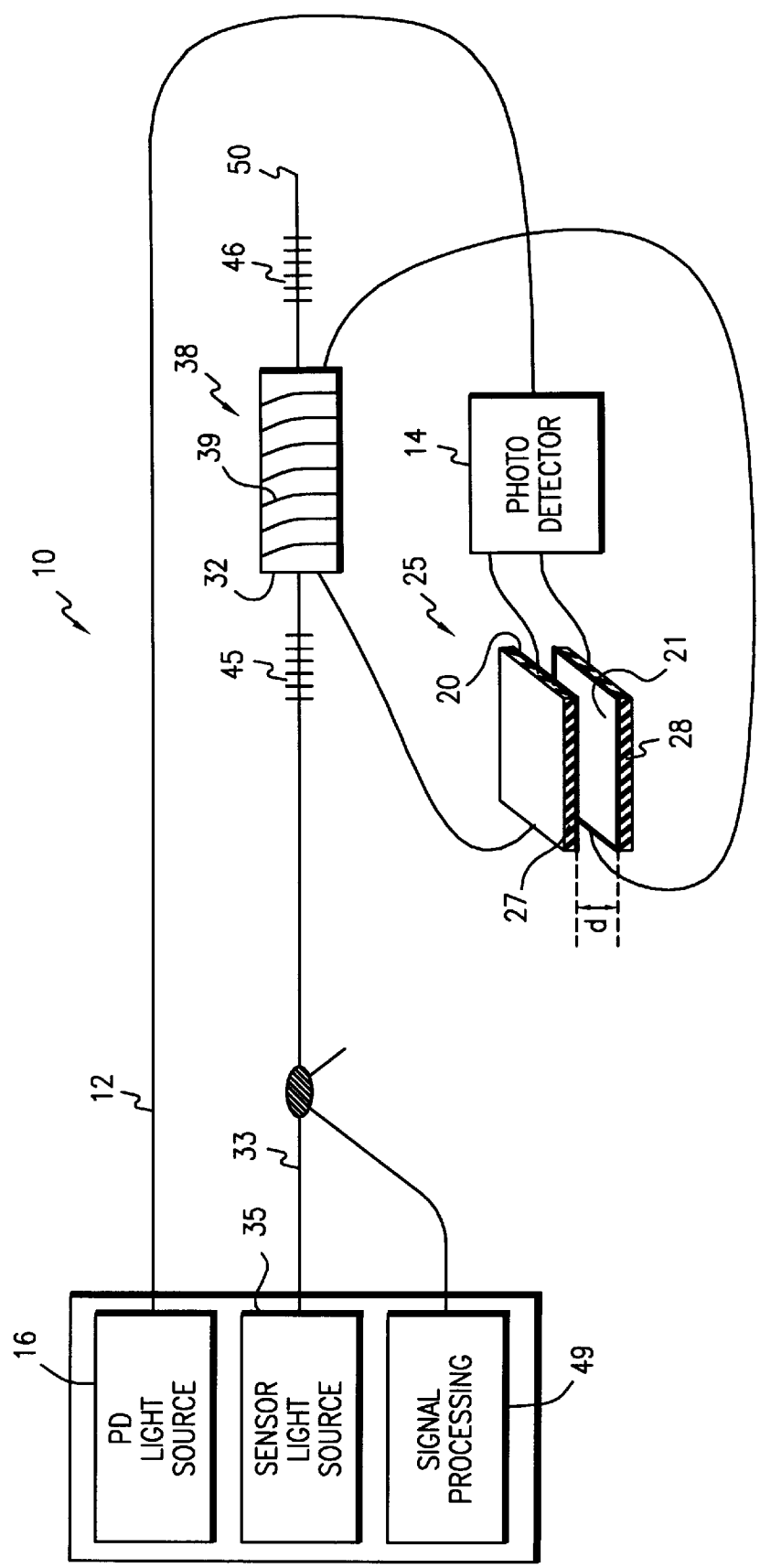
FIG. 1 is a schematic block diagram of a fiber optic resistivity sensor constructed in accordance with the present invention.

The fiber optic sensor of the present invention is particularly well suited for measuring a property or condition of a material (a "parameter"), such as resistivity, capacitance, inductance, frequency, etc. As a resistivity sensor, the present invention is well suited for determining the resistivity of a fluid sample to thereby provide an indication of the fluid content, e.g., amount of oil and water in the fluid sample. Referring to FIG. 1, a first embodiment of a fiber optic resistivity sensor 10 includes an optical fiber 12 interconnected to an optical-to-electrical element 14, such as a photo detector, photodiode, photocell, solar cell, etc. The optical fiber 12 is of the a type known in the art typically including a light guiding core and at least one cladding layer, and wherein an optical signal is transmitted along the core of the optical fiber 12. Light is provided to the optical fiber 12, for example by a broadband light source 16, such as a laser diode.

The light provided to the photo detector 14 is converted into an electrical signal. The output power of the photo detector 14 depends upon the type of photo detector utilized and the sufficiency of the optical signal provided by the light source 16. The photo detector output is applied to a pair of conductive plates 20,21 that form a sensor element 25. The conductive plates 20,21 are spaced apart by a distance d. The voltage $V_{out}$ across the two plates 20,21 generates a current flow i between them. Depending upon the application of the sensor 10 of the invention, some insulation 27,28 may be needed on the outer surfaces of the plates 20,21 to insure that current can only flow in the region between the plates. The output voltage $V_{out}$ from the conductive plates 20,21 is connected to a piezoelectric transducer 32.

The voltage $V_{out}$ applied to the piezoelectric transducer 32 causes a stress of the piezoelectric transducer 32. In particular, the voltage $V_{out}$ applied to the piezoelectric transducer 32 causes a change in at least one of its dimensions. The magnitude of such stress is directly related to the magnitude of the voltage $V_{out}$ applied to the transducer 32.

A second optical fiber 33 connected to a light source, such as a tuned laser 35, includes a sensor element 38 for measuring the stress in the transducer 32. The sensor element 38 includes a length of optical fiber 39 wrapped around the transducer 32. The length of optical fiber 39 wrapper around the transducer 32, together with a pair of Bragg gratings 45,46 form a Fabry Perot interferometer sensing element that detects the stress of the transducer 32. The Bragg gratings 45,46 are formed in the optical fiber 33 immediately preceding and following the length of optical fiber 39 wrapped around the transducer 32.

Bragg gratings (fiber gratings) are well suited for use as sensor elements. When a fiber grating is illuminated, it reflects a narrow band of light at a specified wavelength. However, a strain in the fiber grating, induced for example by stress or vibration of the transducer 32 will induce a change in the fiber grating spacing, which changes the wavelength of the light it reflects. The value (magnitude) of the stress or vibration can be related to the wavelength reflected by the fiber grating and can be determined by detecting the wavelength of the reflected light. In the interferometer arrangement of FIG. 1, the pair of Bragg grating 45,46 and the length of optical fiber 39 form a resonant cavity referred to as a Fabry Perot interferometer. In this case, the sensor is even more sensitive to changes in the stress of the transducer 32 causing changes in the strain of the length of optical fiber 39. As with an individual Bragg grating, changes in the reflection pattern of the interferometer 38 can be directly related to the change in strain in the length of optical fiber 39 caused by the stress of the transducer 32. The light not reflected by the optical sensor 38 is provided to the end of the optical fiber 50. The end of the optical fiber may be prepared to disburse the light not reflected by the optical sensor 38. For example, the end of the fiber 50 may be cleaved at an angle and/or coated with an index matching material to thereby disperse any incident light. Alternatively, the end of the fiber may return to the optical signal processing equipment 49 for processing or as a continuity check as desired.

The optical signal processing equipment 49 is utilized to detect the changes in the reflection pattern of the optical sensor 38. The optical signal processing equipment 49 includes appropriate optical signal analysis equipment for analyzing the return signals from the optical sensor 38. There are various techniques for processing the return signal from individual Bragg gratings and/or interferometers, such as the techniques described in commonly owned copending U.S. patent application Ser. No. 08/786,704, filed on Jan. 21, 1997 and entitled Multiparameter Fiber Optic Sensor for Use in Harsh Environments, the disclosure of which is incorporated herein by reference, with specific reference to the discussion of dynamic and static signal measurement. Other optical signal analysis techniques may be used with the present invention such as the necessary hardware and software to implement the optical signal diagnostic equipment disclosed in U.S. Pat. Nos. 4,996,419; 5,401,956; 5,426,297; and/or 5,493,390, the disclosures of which are inc As is well known in the art, various optical signal analysis approaches may be utilized to analyze return signals from Bragg gratings and interferometers. These approaches may be generally classified in the following four categories:

1. Direct spectroscopy utilizing conventional dispersive elements such as line gratings, prisms, etc., and a linear array of photo detector elements or a CCD array;
2. Passive optical filtering using both optics or a fiber device with wavelength-dependent transfer function, such as a WDM coupler;
3. Tracking using a tuneable filter such as, for example, a scanning Fabry-Perot filter, an acousto-optic filter such as the filter described in the above referenced U.S. Pat. No. 5,493,390, or fiber Bragg grating based filters; and
4. Interferometric detection.

The particular technique utilized will vary, and will depend on the Bragg wavelength shift magnitude (which depends on the sensor design) and the frequency range of the measurand to be detected.

The operation of the invention is best understood by example. Referring to FIG. 1, an input optical signal, such as a broadband optical signal, is provided on the optical fiber 12 to the photo detector 14. For a given light intensity, the photo detector 14 generates a constant amount of power. The output voltage $V_{out}$ is then a function of the resistivity of the fluid (or solid material) in the region between the plates 20,21. The output voltage $V_{out}$ is related to the resistivity through the following relationship:

$$Vout = \sqrt{\frac{I \cdot d \cdot R \cdot e}{A}} = K \cdot \sqrt{R}$$

Where I is the intensity of light, d is the distance between the plates, R is the resistivity, A is the area of the plates 20,21, and e is the conversion efficiency of the photo detector 14. If I=1 mW, d=0.393 in (1 cm), A=1 $in^2$ (6.45 $cm^2$), and e=0.1, then K is 0.039. For 0.1 Ohm-m<R<1000 Ohm-m, the voltage is in between 12 mV and 1.2 V. A voltage in this range can be easily and accurately measured.

The output voltage $V_{out}$ is applied to the transducer 32. In response to the applied voltage, the strain in the transducer changes, i.e., one or more dimensions of the transducer change. This change in the transducer 32 causes a change in the strain of the optical fiber 39 wrapped around the transducer. In effect, this change is strain causes a change in the path length 39 between the gratings 45,46. This causes a change is the wavelength characteristics reflected by the sensor. This change is related to the resistivity of the fluid between the plates 20,21.

If the output power of the photo detector 14 is insufficient, several photo detectors may be coupled to the fiber 16, with their outputs connected in series to thereby provide the desired output power to the resistivity sensor.

The above equation is derived assuming that the dimension of the plates A is much larger than the distance between the plates d and there is no edge effect. In reality, there might be some edge effect. The effect can be calibrated and lump-summed into the efficiency parameter e.

Although the invention is illustrated in FIG. 1 as using a pair of plates, other arrangement, such as a pair of rods may be used. Alternatively, a construct similar to a coaxial cable may be used to implement the resistivity sensor. The photo detector 14 output power is applied between the outer conductive cylinder and the inner one or a wire. For a given power, the voltage is a function of the fluid inside the cylinder. The K factor is different from that of plate configuration.

The invention is described in FIG. 1 as using a Fabry Perot interferometer to implement the sensor of the invention. However, in an alternative configuration of the invention illustrated in FIG. 3, a Bragg grating 60 may be formed in the length of optical fiber that is wrapped around the transducer 32. In this case, as described above, the stress in the transducer 32 is sensed as a wavelength shift of the light reflected by the Bragg grating 60. Referring also to FIG. 3, the wavelength of light reflected by the Bragg grating 60 when it is not subject to strain associated with the piezoelectric sensor has a known central wavelength $\lambda$. However, when the Bragg grating is subject to strain (caused by stress of the piezoelectric element), the optical signal reflected by the Bragg grating 60 has a different (shifted) central wavelength $\lambda'$ that is detected by the optical signal processing equipment 49 as described above. The change in wavelength $\Delta\lambda$ is related to the resistivity of the fluid between the plates 20,21.

Although the invention is illustrated in FIG. 1 as using two separate light sources 16,35 for providing light signals carried by multiple optical fiber 12, 33, the invent may be implement using a signal light sourc Referring to FIG. 4, a light source 116 provides light via an optical fiber 112 to an optical sensor 138 (Fabry Perot interferometer) that is mounted on a piezo electric element 132. The optical fiber 112 continues to a photo detector 114, the output of which powers the resistivity sensor 125. In this embodiment of the invention, care must be taken to select an appropriate light source that is sufficient to power the photo diode 114 while at the same time providing the desired operation of the optical sensor 138.

The invention has been described thus far as utilizing a constant or fixed optical signal for driving a photo detector such that a DC voltage is produced to drive the resistivity sensor. However, as illustrated in FIG. 5, the optical signal used to drive the photo detector may be modulated with a time varying signal, such as a sinusoidal signal, such that an AC voltage is produced at the output of the photo detector. Referring to FIG. 5, an optical modulator 200 is located in the optical fiber 12 at the output of the light source 16. The modulator 200 is coupled to a signal generator 202 such that the optical signal is modulated at a frequency a output $S_o(t)$ of the signal generator 202. Alternatively this can be accomplished by directly modulating the current supply to the light source 16 with the signal generator 202. The output power from the photo detector 14 is a time varying signal having a frequency as determined by the frequency of the optical signal. The signal characteristics of the current flowing in the resistivity sensor circuit 25 may be measured, for example, as the voltage (sensor voltage) across an in line capacitor 212. Alternatively, the voltage drop between the plates 20,21 can be measured as described above. The sensor voltage applied to the transducer 32 is an AC voltage that causes the transducer to vibrate (oscillate) at the frequency of the AC sensing voltage signal across the resistor 212. Referring also to FIG. 6, the detected signal $S'_o(t)$ from the optical sensor will essentially be a scaled replica of the input optical signal $S_o(t)$. However, the detected signal $S'_o(t)$ will be phase shifted with respect to the input signal by an amount $\tau$ that is directly related to the RC time constant of the resistivity sensor circuit 25. Assuming that the capacitance value is fixed and known, the resistivity value can then be determined by determining the phase shift $\tau$ between the input optical signal $S_o(t)$ and the output optical signal $S'_o(t)$. It is assumed that the capacitance of the arrangement is relatively constant. However, if there are variations in the capacitance, associated for example with temperature or other parameters, a large fixed capacitance may be inserted into the circuit to mask any capacitance variations that may occur.

Figure 7:
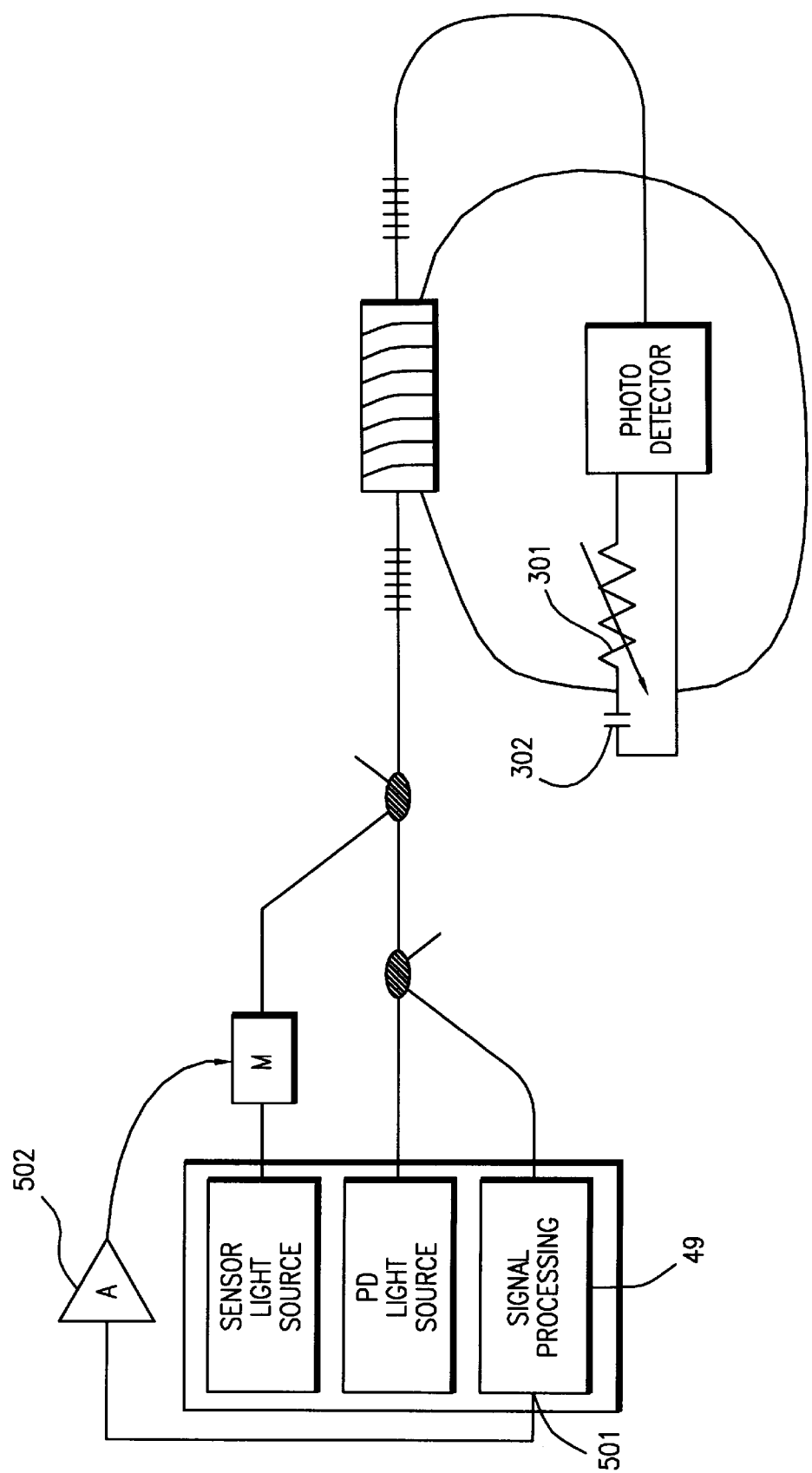
FIG. 7 is a schematic block diagram of a fourth embodiment of the invention utilizing a variable resistance device.
Figure 8:
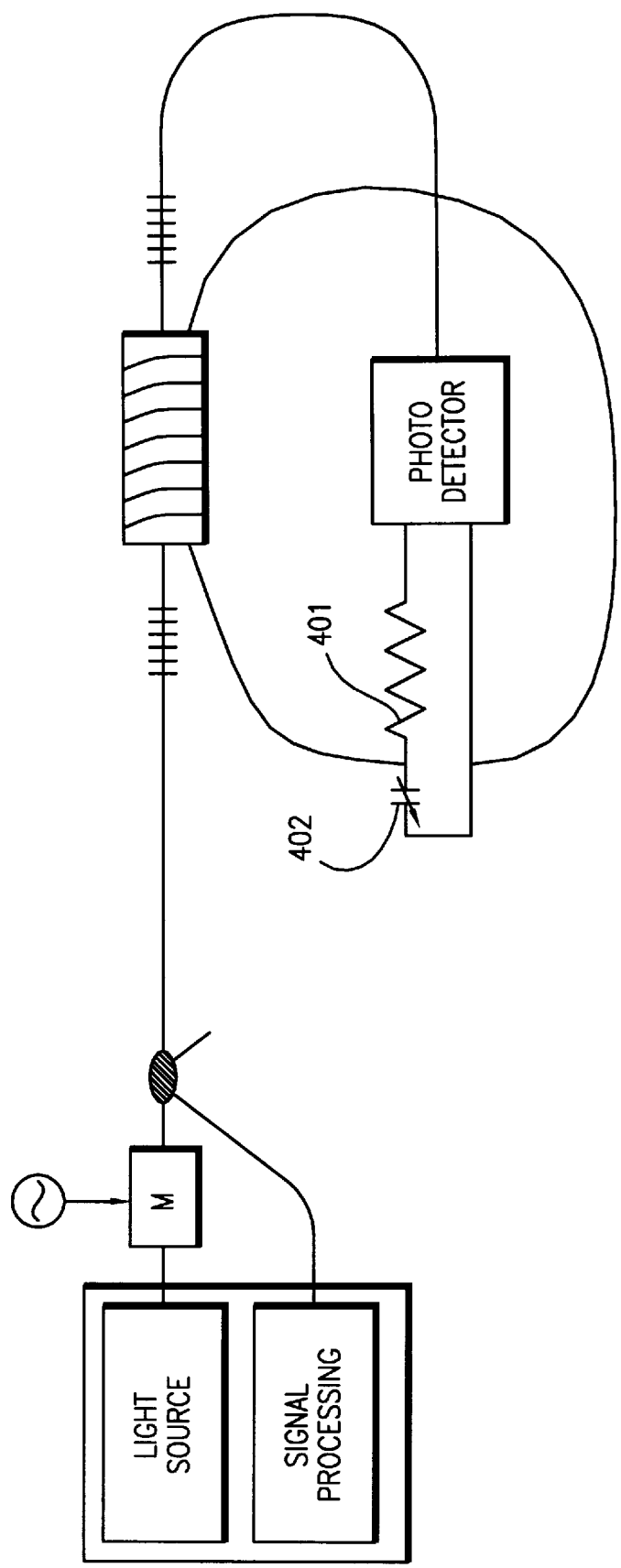
FIG. 8 is a schematic block diagram of a fifth embodiment of the invention utilizing a variable capacitance device.

Referring now to FIG. 7, rather than measuring the resistivity of a material, the present invention can be used to measure any variable resistance value. For example, a variable resistor 301 and a fixed capacitance 302 may be place in a RC circuit with the magnitude of the variable resistance 301 being related to a condition to be monitored. For example, the resistance value 301 may be indicative of the position of a valve, operator, etc. A direct mechanical linkage may be made between the variable resistance and the condition to be monitored. The principles of the invention can thereafter be employed to determine the value of the variable resistance, and therefor the condition being monitored. Referring also to FIG. 8, rather than employing a variable resistance, the resistance 401 may be fixed and a variable capacitance 402 may be used to be indicative of a condition to be monitored.

Returning to FIG. 7, rather than using an oscillator to modulate the output of the photo detector light source, a feedback arrangement may be used to cause the sensor to oscillate. For example, the output 501 of the signal processing equipment 49 may be fed back to the modulator 200 via an amplifier 502. This arrangement will naturally begin to resonate at a frequency as determined by the RC time constant of the resistivity sensing circuit. As will be understood by those skilled in the art, the piezoelectric element 32 and the values of resistance 301 and capacitance 302 must be selected such that the resonance frequency is within a desired frequency range. The resistivity is determined by measuring the resonance frequency.

Figure 9:
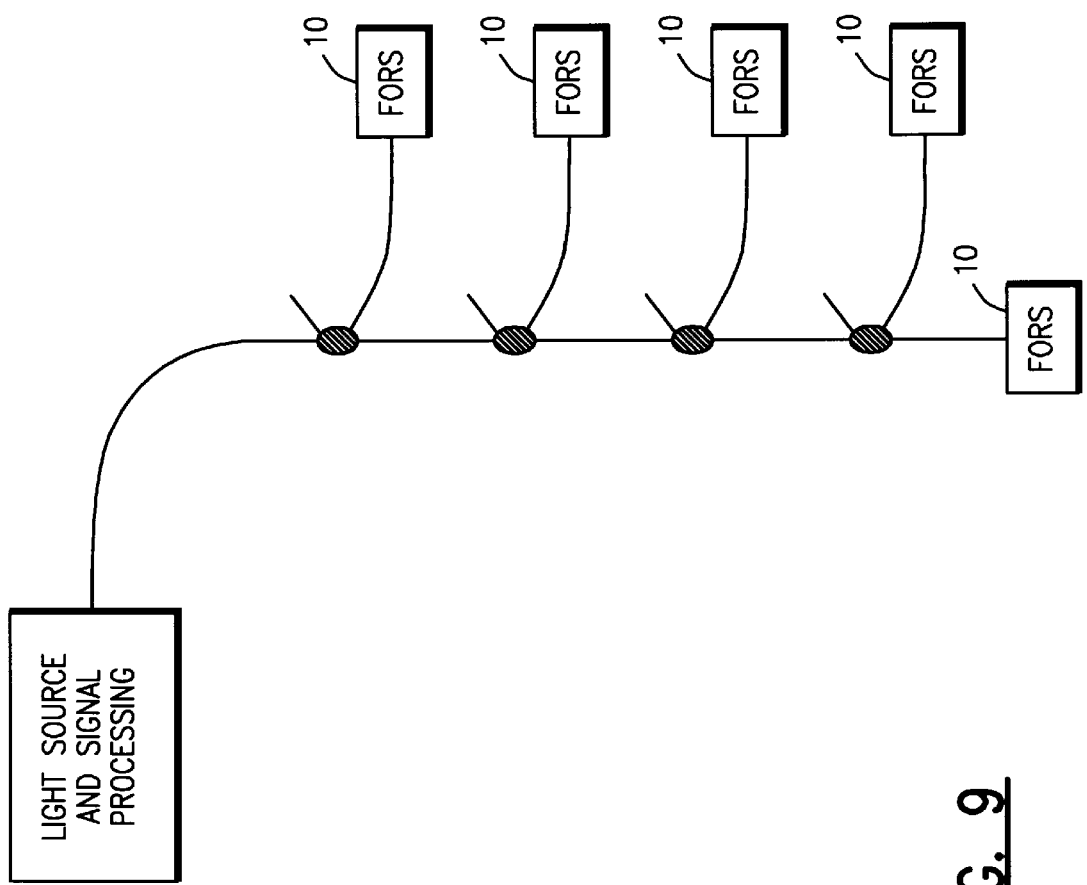
FIG. 9 is a schematic block diagram showing a plurality of fiber optic sensors of FIG. 7 multiplexed together.

Although only a single sensor 10 has been illustrated herein, a plurality of sensors may be multiplexed together in a resistivity (or capacitance) sensing system. FIG. 9 shows a fiber resistivity sensing system 600 using a plurality of fiber optic resistivity sensors 10 of the invention. In this case, each of the sensors 10 may be coupled to a single optical fiber. The optical signal processing equipment may operate on a principle of wave-division multiplexing wherein each Bragg grating sensor is utilized at a different passband or frequency band of interest. Therefore, the sensing signals from the various sensors can easily be differentiated from one another. Alternatively, the present invention may utilize time-division multiplexing for obtaining signals from multiple independent sensors, or any other suitable means for analyzing signals returned from a plurality of Bragg grating sensors formed in a fiber optic sensor string.

Figure 10:
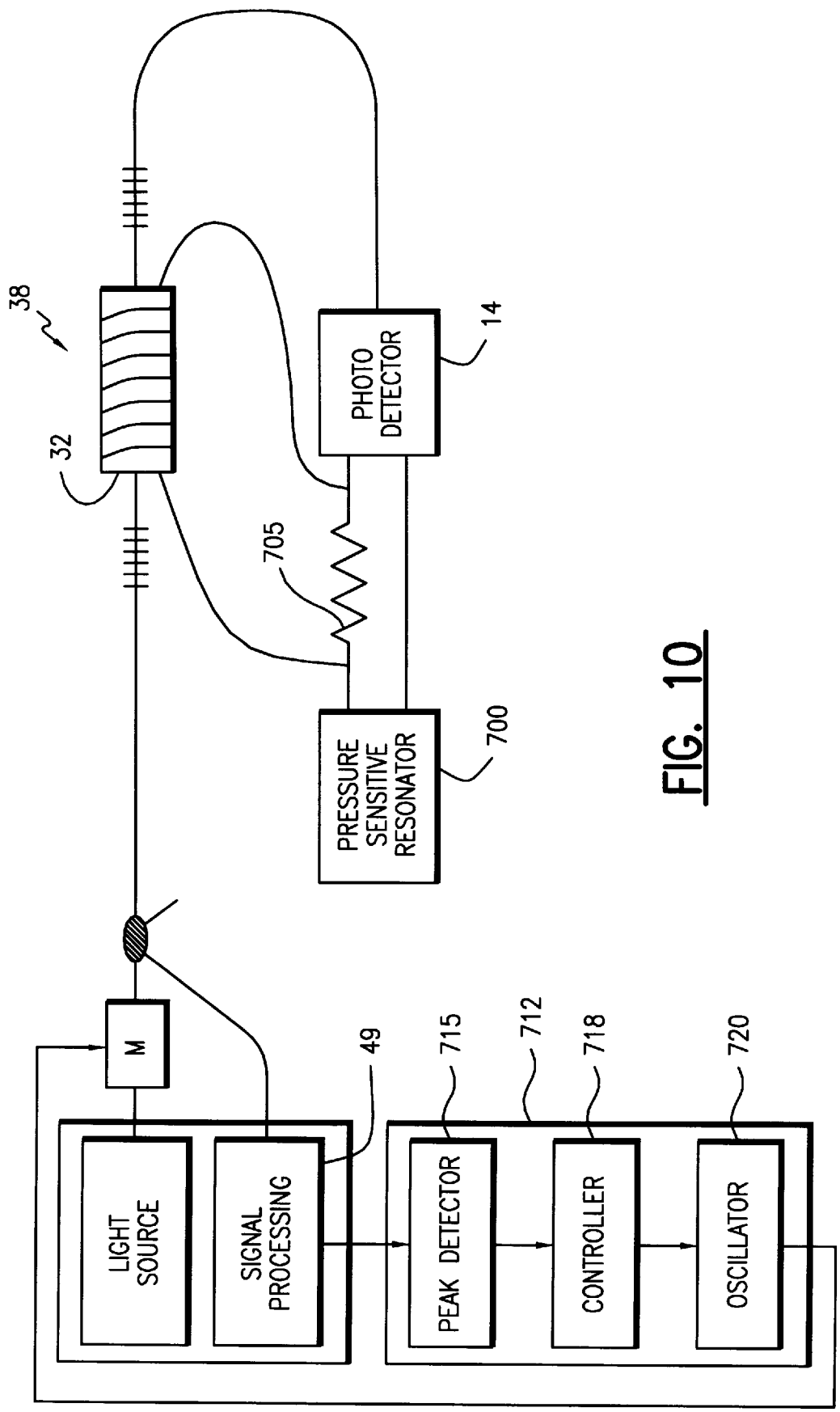
FIG. 10 is a schematic block diagram of a sixth embodiment of the invention utilizing a pressure sensitive resonator as the sensing element.

Referring to FIG. 10, in a further embodiment of the invention, the output of the photo detector 14 may be interconnected to a pressure sensitive resonator 700, such as a quartz resonator. The light source frequency causes resonator 700 to oscillate. As described below, the light source frequency is controlled to cause the pressure sensitive resonator 700 to oscillate at its resonance frequency. The resonance frequency of the pressure sensitive resonator 700 will vary with changes in the pressure to which it is exposed. If a resistor 705 is placed in series with the pressure sensitive resonator 700, the voltage drop across the resistor will have a frequency corresponding to the resonance frequency. This voltage signal is thereafter applied to the transducer 32, which will vibrate at the resonance frequency (the frequency of the applied voltage signal). As described above with respect to the embodiment of FIG. 5, the optical sensor 38 and signal processing circuitry 49 are used to detect this frequency. The measured frequency from the signal processing circuitry 49 may be provided to a frequency control circuit 712 that is used to generate a frequency to modulate the input optical signal. The frequency is controlled to equal the resonance frequency of the pressure sensitive resonator 700. The frequency control circuit 712 may include, for example, 715 that detects that frequency at which the magnitude of the optical sensing signal is a maximum value. A controller 718 and oscillator 720, e.g., a voltage controlled oscillator, are provided such that the controller controls the oscillator to oscillate at the frequency determined by the peak detection circuit 715.

The invention is described herein as using a sensing element that include a resistance component and a capacitance component. However, it will be understood in the art that inductive type sensors may be used as the sensing element in accordance with the invention. For example, an inductive sensor may be used to detect wave propagation within a material or structure. In an embodiment of the invention utilizing an inductive sensor, the sensor may be driven by an AC signal at the output of the photo detector, such as the arrangement illustrated in FIG. 5. The magnitude of the phase shift in the sensing optical signal will then depend upon the magnitude of the variable inductance. Alternatively, in a feedback arrangement such as the feedback arrangement illustrated in FIG. 7, the resonance frequency of the sensor will depend upon the magnitude of the inductance.

It will be further understood by those skilled in the art that most sensor arrangements have an inherent resistance, capacitance and inductance component. While one or more of these components may be negligible, all that is required in accordance with the present invention is that one of these components be variable in response to the change in a parameter associated with a material or condition for providing an output optical signal indicative of the parameter associated with the material or condition.

The invention has been illustrated herein as being used with either an AC or DC input optical signal for generating either an AC or DC output electrical signal from the photo detector for operating a sensor or other device. However, it will be understood by those skilled in the art that other input optical signals may be used, such as a pulsed signal. In this case, the decay time constant associated with the optical sensing signal is indicative of the resistance, inductance, capacitance time constant of the sensor.

The invention has been described herein as using either an individual Bragg grating or a Bragg grating interferometer (Fabry Perot interferometer) as the optical strain sensor. However, it will be understood by those skilled in the art that any suitable optical strain sensor, such as a Bragg grating laser element or other suitable interferometric optical strain sensing element, may be used in accordance with the present invention. The use of the phrase "optical strain sensor" is intended to refer to any on of these sensors. Additionally, although the optical strain sensor is described as being mounted to the measurement device (piezoelectric element) by winding of the fiber around the element, the optical strain sensor may be mounted in any suitable configuration provided that the change in the dimension(s) of the measurement device are translated to cause a strain in the optical strain sensor.

When the system of the invention is deployed in a harsh environment, such as within an oil or gas well, the fiber or fiber bundle can be deployed inside the casing or embedded permanently in the cement outside of the casing. Alternatively, various fiber packaging and fiber protection arrangements may be used, such as deploying the optical fiber(s) within a hermetically sealed capillary tube, such as the arrangement described in commonly owned copending U.S. patent application Ser. No. 08/925,598 filed on Sep. 9, 1997 and entitled HIGH SENSITIVITY FIBER OPTIC PRESSURE SENSOR FOR USE IN HARSH ENVIRONMENTS, the disclosure of which is incorporated herein by reference. Similarly, the sensor components, including the piezoelectric material, the optical sensor, and the photo detector, may be packaged to be isolated from the environment with only the electrodes/plates 20,21 (sensing device) exposed to the environment for making the desired measurements.

Although the invention has been described and illustrated with respect to exemplary embodiments thereof, the foregoing and various other additions and omissions may be made therein and thereto without departing from the spirit and scope of the present invention.

We claim:

1. A fiber optic sensor, comprising:

an optical light source for providing an input optical signal to an optical fiber;

an optical-to-electrical conversion element, connected to said optical fiber, for converting optical power of said input optical signal into an electrical power signal;

a sensor element responsive to said electrical power signal and to at least one parameter for providing an output electrical signal that is dependent upon said at least one parameter;

a measurement device having at least one dimension that varies in response to changes in said output electrical signal; and an optical strain sensor formed in said optical fiber, said optical strain sensor being mounted such that changes in said at least one dimension of said measurement device causes changes in the strain of said optical strain sensor, said optical strain sensor being responsive to said input optical signal and said change in strain for providing an optical sensing signal indicative of said at least one parameter.

2. The fiber optic sensor of claim 1, wherein said optical light source includes:

a first optical light source for providing a first input optical signal to said optical-to-electrical conversion element; and a second optical light source for providing a second input optical signal to said optical strain sensor.

3. The fiber optic sensor of claim 1, wherein said optical strain sensor includes a length of said optical fiber disposed on said measurement device, said length of said optical fiber having a Bragg grating formed therein.

4. The fiber optic sensor of claim 1, wherein said optical strain sensor includes an interferometer having a length of said optical fiber disposed on said measurement device, said length of said optical fiber being positioned between a pair of Bragg gratings formed in said optical fiber.

5. A fiber optic sensor according to claim 1,
wherein said at least one parameter is the resistivity of a material,
wherein said sensor element is a resistivity sensor including a pair of spaced apart conductive elements, said electrical power signal being applied to said spaced apart conductive elements and said material being positioned between said conductive elements, and
wherein said output electrical signal is related to the resistivity of said material.

6. A fiber optic sensor according to claim 5, wherein said material is a fluid mixture and wherein said optical sensing signal is related to the composition of said fluid.

7. A fiber optic sensor according to claim 1, wherein said input optical signal is a direct current (DC) signal such that said optical-to-electrical conversion element generates an electrical power signal which induces a DC signal in said sensor element.

8. A fiber optic sensor according to claim 1, wherein said input optical signal is modulated at a selected frequency such that said optical-to-electrical conversion element generates an electrical power signal which induces an alternating current (AC) signal in said sensor element.

9. A fiber optic sensor according to claim 8, wherein said sensor element is a circuit having a resistance component and a capacitance component, wherein either said resistance component or said capacitance component varies in response to changes in said at least one parameter, and wherein said optical sensing signal has a frequency equal to said selected frequency that is phase shifted with respect to said input optical signal by an amount as determined by the magnitude of said resistance and capacitance components.

10. A fiber optic sensor according to claim 8, wherein said sensor element is a circuit having a resistance component and an inductance component, wherein either said resistance component or said inductance component varies in response to changes in said at least one parameter, and wherein said optical sensing signal has a frequency equal to said selected frequency that is phase shifted with respect to said input optical signal by an amount as determined by the magnitude of said resistance and inductance components.

11. A fiber optic sensor according to claim 8, wherein said sensor element is a circuit having a capacitance component and an inductance component, wherein either said capacitance component or said inductance component varies in response to changes in said at least one parameter, and wherein said optical sensing signal has a frequency equal to said selected frequency that is phase shifted with respect to said input optical signal by an amount as determined by the magnitude of said capacitance and inductance components.

12. A fiber optic sensor according to claim 8, wherein said sensor element is a circuit having a resistance component, a capacitance component and an inductance component, wherein either said resistance component, said capacitance component or said inductance component varies in response to changes in said at least one parameter, and wherein said optical sensing signal has a frequency equal to said selected frequency that is phase shifted with respect to said input optical signal by an amount as determined by the magnitude of said resistance, capacitance and inductance components.

13. A fiber optic sensor according to claim 1, further comprising:
modulating means for modulating said input optical signal; and
feedback means for applying said optical sensing signal to said modulating means such that said input optical signal is modulated by said optical sensing signal;
wherein said sensor element is a circuit having a resistance component and a capacitance component,
wherein either said resistance component or said capacitance component varies in response to changes in said at least one parameter;
wherein said circuit oscillates at a resonance frequency that is related to the magnitude of said resistance and capacitance components; and
wherein said optical sensing signal frequency is said resonance frequency.

14. A fiber optic sensor according to claim 1, further comprising:
modulating means for modulating said input optical signal; and
feedback means for applying said optical sensing signal to said modulating means such that said input optical signal is modulated by said optical sensing signal;
wherein said sensor element is a circuit having a resistance component and an inductance component,
wherein either said resistance component or said inductance component varies in response to changes in said at least one parameter;
wherein said circuit oscillates at a resonance frequency that is related to the magnitude of said resistance and inductance components; and
wherein said optical sensing signal frequency is said resonance frequency.

15. A fiber optic sensor according to claim 1, further comprising:
modulating means for modulating said input optical signal; and
feedback means for applying said optical sensing signal to said modulating means such that said input optical signal is modulated by said optical sensing signal;
wherein said sensor element is a circuit having a capacitance component and an inductance component,
wherein either said capacitance component or said inductance component varies in response to changes in said at least one parameter;
wherein said circuit oscillates at a resonance frequency that is related to the magnitude of said capacitance and inductance components; and
wherein said optical sensing signal frequency is said resonance frequency.

16. A fiber optic sensor according to claim 1, further comprising:
modulating means for modulating said input optical signal; and
feedback means for applying said optical sensing signal to said modulating means such that said input optical signal is modulated by said optical sensing signal;
wherein said sensor element is a circuit having a resistance component, a capacitance component and an inductance component,
wherein either said resistance component, said capacitance component or said inductance component varies in response to changes in said at least one parameter;
wherein said circuit oscillates at a resonance frequency that is related to the magnitude of said resistance, capacitance and inductance components; and
wherein said optical sensing signal frequency is said resonance frequency.

17. The fiber optic sensor of claim 1, wherein said sensor element is a resonator that oscillates in response to said electrical power signal, the frequency of said oscillations changing in response to changes in said at least one parameter, and wherein both said output electrical signal and said optical sensing signal have a frequency component that is equal to the frequency of oscillations of said resonator.

18. The fiber optic sensor of claim 17, wherein said resonator is a pressure sensitive resonator, and wherein said at least one parameter is pressure.

19. The fiber optic sensor of claim 1, wherein said measurement device is a piezoelectric element.

20. The fiber optic sensor of claim 1, wherein said input optical signal is a pulsed signal, and wherein a decay rate of said optical sensing signal is indicative of said parameter.

21. A fiber optic sensing system according to claim 1 including a plurality of said fiber optic sensor multiplexed together along said optical fiber.

22. A fiber optic sensor, comprising:
an optical light source for providing an input optical signal to an optical fiber;
modulation means for modulating said input optical signal in said optical fiber;
an optical-to-electrical conversion element, connected to said optical fiber, for converting optical power of said input optical signal into an electrical power signal;
a sensor element responsive to said electrical power signal and to at least one parameter for providing an output electrical signal that is dependent upon said at least one parameter;
a measurement device having at least one dimension that varies in response to changes in said output electrical signal;
an optical strain sensor formed in said optical fiber, said optical strain sensor being mounted to said measurement device such that changes in said at least one dimension of said measurement device causes changes in the strain of said optical strain sensor, said optical strain sensor being responsive to said input optical signal and said change in strain for providing an optical sensing signal indicative of said at least one parameter.

23. A fiber optic sensor according to claim 22, further comprising feedback means for applying said optical sensing signal to said modulation means for modulating said input optical signal with said optical sensing signal.

24. A fiber optic sensor according to claim 23, wherein said feedback means causes said sensing means to resonate at a resonance frequency, said optical sensing signal having a frequency equal to said resonance frequency, and further comprising optical signal processing means for determining the amplitude and frequency of said optical sensing signal.

25. A fiber optic resistivity sensor for determining the resistivity of a material, comprising:
an optical light source for providing an input optical signal to an optical fiber;
an optical-to-electrical conversion element, connected to said optical fiber, for converting optical power of said input optical signal into an electrical power signal;
a resistivity sensor element having a pair of spaced apart conductive elements, said resistivity sensor element being responsive to said electrical power signal being applied to said spaced apart conductive elements and said material being positioned between said conductive elements for providing an output electrical signal related to the resistivity of said material, and
a measurement device having at least one dimension that varies in response to changes in said output electrical signal; and
an optical strain sensor formed in said optical fiber, said optical strain sensor being mounted to said measurement device such that changes in said at least one dimension of said measurement device causes changes in the strain of said optical strain sensor, said optical strain sensor being responsive to said input optical signal and said change in strain for providing an optical sensing signal indicative of the resistivity of said material.

26. A fiber optic sensor according to claim 25, wherein said material is a fluid and wherein said optical sensing signal is related to the resistivity of said fluid.

27. A fiber optic sensor according to claim 25, wherein said material is a fluid mixture containing at least oil and water, and wherein said optical sensing signal is related to the resistivity of said fluid mixture such that the relative water and oil content in said fluid mixture can be determined.

28. A fiber optic sensor according to claim 25, further comprising:
modulating means for modulating said input optical signal with a modulation signal having a selected frequency;
wherein said resistivity sensor element has a resistance component and a capacitance component,
wherein said resistance component varies in relation to the resistivity of said material; and
wherein said optical sensing signal has a frequency equal to said selected frequency that is phase shifted with respect to said input optical signal by an amount related to said resistance and capacitance components.

29. A fiber optic sensor according to claim 28, wherein said material is a fluid mixture containing at least oil and water, and wherein said optical sensing signal is related to the resistivity of said fluid mixture such that the relative water and oil content in said fluid mixture can be determined.

30. A fiber optic sensor according to claim 29, wherein said measurement device is a piezoelectric element.

31. A fiber optic sensor according to claim 25, further comprising:
modulating means for modulating said input optical signal with a modulation signal having a selected frequency;
feedback means for applying said optical sensing signal to said modulating means such that said input optical signal is modulated by said optical sensing signal;
wherein said resistivity sensor element has a resistance component and a capacitance component,
wherein said resistance component varies in relation to the resistivity of said material; and
wherein said resistivity sensor element oscillates at a resonance frequency that is related to the magnitude of said resistance and capacitance components; and
wherein said optical sensing signal frequency is said resonance frequency.

32. A fiber optic sensor according to claim 31, wherein said material is a fluid mixture containing at least oil and water, and wherein said optical sensing signal is related to the resistivity of said fluid mixture such that the relative water and oil content in said fluid mixture can be determined.

33. A fiber optic sensor according to claim 32, wherein said measurement device is a piezoelectric element.

* * * * *

UNITED STATES PATENT AND TRADEMARK OFFICE
CERTIFICATE OF CORRECTION

PATENT NO.    : 5,986,749
DATED         : November 16, 1999
INVENTOR(S)   : Jian-Qun Wu et al.

It is certified that error appears in the above-identified patent and that said Letters Patent is hereby corrected as shown below:

Title page,
Item [56], References Cited, please add:

```
            -- U.S. PATENT DOCUMENTS
    5,089,696    2/1992      M. Turpin      250/227.21
    5,497,233    3/1996      A. D. Meyer    356/345 --

Please insert: -- FOREIGN PATENT DOCUMENTS
    3127333      1/1983      Germany        G02F   1/11
    3411096      1/1985      Germany        G08C   15/06 --
```

Signed and Sealed this

Tenth Day of December, 2002

JAMES E. ROGAN
*Director of the United States Patent and Trademark Office*